United States Patent Office 2,801,244
Patented July 30, 1957

2,801,244
TRIFUNCTIONAL ISOCYANATE TRIMERS

Walter J. Balon, Carney's Point, N. J., assignor to E. I. du Pont de Nemours and Company, Wilmington, Del., a corporation of Delaware No Drawing. Application July 10, 1956,
Serial No. 596,851

5 Claims. (Cl. 260—248)

This invention relates to novel trifunctional isocyanate trimers and more particularly to the trimers of 4-lower alkyl-m-phenylene diisocyanate.

In many applications of isocyanates, it would be highly desirable if a polyfunctional isocyanate were available in which the isocyanate groups would not react under ordinary or room temperature conditions but which would react at somewhat elevated temperatures and that such an isocyanate material would be readily soluble in most reaction media.

This invention has as an object to provide novel polyisocyanate compounds having hindered isocyanate groups which do not react under many conditions. A further object is to provide the trimers of 4-lower alkyl-m-phenylene diisocyanate and a method for the preparation thereof. Other objects will appear hereinafter.

These and other objects are accomplished by the novel trifunctional isocyanate trimers having the formula

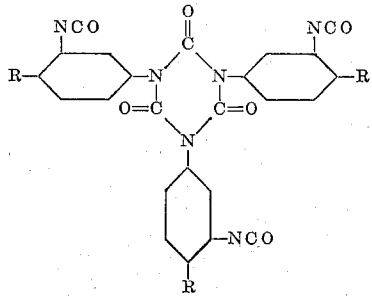

wherein R is a lower alkyl radical. The preferred process for preparing these trifunctional isocyanate trimers involves treating 4-lower alkyl-m-phenylene diisocyanate with a catalytic amount of tri-n-butyl phosphine. They may also be prepared by treating the 4-lower alkyl-m-phenylene diisocyanate monomer with dimethyl formamide saturated with sodium benzoate. These processes are more particularly illustrated in the following examples. The diisocyanate monomers from which the trimers of the present invention are prepared are well known in the art, with the exception of 4-tert.butyl-m-phenylene diisocyanate. This compound is more particularly described and claimed in copending application of Stilmar, U. S. Serial No. 516,035, filed June 16, 1955. 4-tert.butyl-m-phenylene diisocyanate may be prepared by the reduction of the corresponding dinitro compound to the diamine and the subsequent phosgenation of the diamine to produce the diisocyanate.

The novel trimers of the present invention are soluble in methanol, benzene, ethyl acetate, toluene and tetrahydrofuran but insoluble in petroleum ether or octane. This solubility is very advantageous in preparing adhesive formulations and the like. In the preparation of these formulations, it is desirable to have an isocyanate material which will remain stable on storage. With the use of these novel trimers, wherein all three of the —NCO groups are shielded with lower alkyl groups, it is possible to make an adhesive which will remain stable for a matter of days and still have reactive isocyanates which can be utilized when they are heated to a somewhat higher temperature. These isocyanate adhesive formulations can be used to adhere metal to metal, plastic to metal, plastic to plastic, etc. The use of these trimers in adhesive formulations is more particularly described in the examples. The novel trimers of the present invention may also be used as curing agents for elastomers containing active hydrogen atoms.

The following examples will better illustrate the nature of the present invention. Parts are by weight unless otherwise indicated.

Example 1

To 30 parts of 4-tert.butyl-m-phenylene diisocyanate in an agitated vessel is added 0.13 part of tri-n-butyl phosphine. The mixture is thoroughly stirred and then allowed to stand overnight with slow stirring. Some heat of reaction is observed initially and the liquid slowly becomes very viscous. At this stage it is transferred from the vessel into a closed, shallow vessel where it slowly solidifies. The solid product is then broken up and extracted with boiling petroleum ether. The petroleum ether insoluble product which is the trimer is dissolved in 150 parts of ethyl acetate at room temperature and further diluted by the addition of 100 parts of isooctane. The solution thus obtained is evaporated until crystallization begins and then it is cooled. The white crystalline material is filtered off and washed with a small amount of isooctane. On drying at 80° C., there is obtained 21 parts of the dry product in the form of colorless needles which melt at 310–311° C. The product is soluble in ethyl acetate, tetrahydrofuran, benzene, carbon tetrachloride and methyl alcohol but insoluble in petroleum ether or isooctane. Analysis shows 19.1% —NCO compared with a theory of 19.45%. Infrared absorption curves show the presence only of the trimeric structure and none of the dimeric structure.

Example 2

To 25 parts of 4-tert.butyl-m-phenylene diisocyanate dissolved in 100 parts of dry isooctane is added 0.5 part of tri-n-butyl phosphine. The solution is stirred 3 to 4 hours at room temperature and then allowed to stand for 48 hours. A solid crystalline product separates during this time. It is filtered off, washed with isooctane and dried at 80° C. The yield is 14 parts of the trimer of 4-tert.butyl-m-phenylene diisocyanate melting at 308–311° C. Recrystallization from ethyl acetate and isooctane yields a purified product melting at 310–311° C. Infrared spectral analysis shows it to be identical with the product of Example 1.

Example 3

To 15 parts of cumene-2,4-diisocyanate is added 0.5 part of tri-n-butyl phosphine at room temperature and the mixture is stirred well. The temperature rises to about 62° C. and the liquid becomes quite viscous in a short time. After standing without further agitation and at room temperature overnight, a transparent solid mass forms. The mass is broken up, powdered and extracted with boiling petroleum ether to remove any unreacted diisocyanate and the catalyst. 13.6 parts of a white powder is obtained which melts at 346–350° C. Infrared analysis shows the trimer structure characteristic of Example 1 with only a trace of dimer structure. The trimer is soluble in ethyl acetate, carbon tetrachloride, benzene and tetrahydrofuran.

Example 4

To 15 parts of 4-sec.butyl-m-phenylene diisocyanate is added 0.5 part of tri-n-butyl phosphine with stirring at room temperature. The reaction is exothermic and the temperature rises to about 57° C. and the liquid becomes viscous. After standing overnight at room temperature, a clear, brittle solid is obtained. It is broken up and extracted with boiling petroleum ether. 13.3 parts of a white powder, melting at 364–367° C., is obtained. Infrared analysis shows it to be the trimer and it is soluble in ethyl acetate, carbon tetrachloride, benzene and tetrahydrofuran.

The trimers of 4-methyl-m-phenylene diisocyanate and 4-ethyl-m-phenylene diisocyanate may be prepared in a manner similar to that used to prepare the trimers in Examples 1 to 4.

Example 5

To 122 parts of toluene-2,4-diisocyanate is added 2 parts of dimethyl formamide saturated with sodium benzoate with stirring at room temperature. The temperature rises to about 40° C. and the mixture thickens. After standing overnight at room temperature, a semi-crystalline mass is obtained. The mass is extracted with several portions of anhydrous ether. The crystalline solid is finally filtered and dried under vacuum. 62 parts of a white crystalline solid is obtained. Infrared analysis shows the band at 5.85 microns which is characteristic of the trimer. Analysis for —NCO shows 23.0% compared to a theory of 24.1%. The molecular weight determined by the boiling point method is 533 compared to a theory of 522.

Example 6

To 12 parts of cumene-2,4-diisocyanate at room temperature is added about 0.2 part of dimethyl formamide saturated with sodium benzoate. The temperature is maintained at 25–30° C. with slight cooling for 4 hours. The viscous mass is dissolved in anhydrous ether and then poured into petroleum ether to precipitate the trimer. The trimer is filtered off and dried. 6 parts of a white powder is obtained showing the characteristic trimer band by infrared analysis.

Example 7

An adhesive formulation is made by mixing 2 parts of methylethyl ketone, 3 parts of the trimer of 4-tert.butyl-m-phenylene diisocyanate and 1.1 parts of a polyester prepared by heating and stirring together 438 parts of adipic acid, 248 parts of ethylene glycol, 92 parts of glycerine, and 148 parts of phthalic anhydride for 16 hours at 175° C. while passing a slow stream of nitrogen through the vessel, then continuing the heating for an additional 2 hours at an absolute pressure of 2–5 mm. of mercury.

Cold rolled steel panels are bonded together with a one-half inch overlap flap joint by spreading both surfaces with a thin coating of this adhesive formulation, allowing them to stand for 15 minutes to allow the solvent to evaporate and then pressing the surfaces together in a mold and heating at the time and temperature indicated in the table below. Also given are the pounds necessary to rupture the bond. These are averages of 3 samples. The tests are made on an "Instron" testing machine.

| | | | |
|---|---|---|---|
| Length of cure, hours | 1 | 5 | 5 |
| Temperature of cure, °C | 120 | 120 | 190 |
| Lbs. to rupture bond | 228 | 668 | 772 |
| Average bond strength, lbs./sq. in | 456 | 1,336 | 1,544 |

As many widely different embodiments of this invention may be made without departing from the spirit and scope thereof, it is to be understood that this invention is not limited to the specific embodiments thereof except as defined in the appended claims.

This application is a continuation-in-part of copending application Serial No. 516,034, filed June 16, 1955, now abandoned.

What is claimed is:

1. Isocyanate trimers having the formula

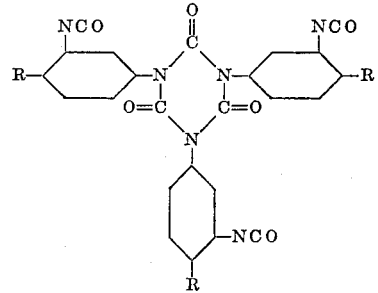

wherein R is a lower alkyl radical.

2. The trimer of claim 1 wherein the R's are tertiary butyl radicals.

3. The trimer of claim 1 wherein the R's are secondary butyl radicals.

4. The trimer of claim 1 wherein the R's are isopropyl radicals.

5. The trimer of claim 1 wherein the R's are methyl radicals.

No references cited.